US010118311B2

(12) United States Patent
Thiers et al.

(10) Patent No.: US 10,118,311 B2
(45) Date of Patent: Nov. 6, 2018

(54) BOARD, METHODS FOR MANUFACTURING BOARDS, AND PANEL WHICH COMPRISES SUCH BOARD MATERIAL

(75) Inventors: Bernard Thiers, Eine (BE); Lode De Boe, Moorslede (BE); Peter Hochepied, Izegem (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 781 days.

(21) Appl. No.: 12/738,531

(22) PCT Filed: Oct. 16, 2008

(86) PCT No.: PCT/IB2008/002741

§ 371 (c)(1), (2), (4) Date: Jul. 13, 2010

(87) PCT Pub. No.: WO2009/050565

PCT Pub. Date: Apr. 23, 2009

(65) Prior Publication Data

US 2010/0311854 A1 Dec. 9, 2010

Related U.S. Application Data

(60) Provisional application No. 61/064,192, filed on Feb. 21, 2008.

(30) Foreign Application Priority Data

Oct. 19, 2007 (BE) .................................. 2007/0507

(51) Int. Cl.

*C08L 97/02* (2006.01)
*B27N 3/00* (2006.01)
*E04F 15/02* (2006.01)

(52) U.S. Cl.

CPC ................ *B27N 3/00* (2013.01); *E04F 15/02* (2013.01)

(58) Field of Classification Search

CPC ... B27N 3/00; B27N 3/04; B27N 3/06; B27N 3/28; E04F 15/00; E04F 15/02;

(Continued)

(56) References Cited

U.S. PATENT DOCUMENTS 2,376,653 A * 5/1945 Boyer ..................... B32B 27/00 105/355
3,274,046 A * 9/1966 Shannon ............... B29C 69/001 156/79

(Continued)

FOREIGN PATENT DOCUMENTS

CN 1348853 A 5/2002
CN 1554843 A 12/2004

(Continued)

OTHER PUBLICATIONS

International Search Report in PCT/IB2008/002741, dated Mar. 25, 2009.

(Continued)

*Primary Examiner* — Camie S Thompson
(74) *Attorney, Agent, or Firm* — Bacon & Thomas, PLLC

(57) ABSTRACT

Board, wherein this board substantially consists of a material mass which is pressed and which comprises at least two components, namely a first component consisting of organic material, and a second component functioning as a binding agent for said first component, with the characteristic that said material mass is composed differently in the plane of the board. The invention also relates to methods by which such board can be manufactured, as well as to panels comprising such board material.

13 Claims, 5 Drawing Sheets

(58) Field of Classification Search
CPC . E04F 15/04; E04F 15/10; E04F 15/14; E04F 21/0092; B32B 27/00; B32B 27/02; B32B 27/04; B32B 27/06; B32B 27/065; B32B 27/12; C08L 97/02
USPC ...... 524/13, 84.1; 521/84.1; 428/195.1, 200, 428/292.1–300.4
See application file for complete search history.

(56) References Cited

U.S. PATENT DOCUMENTS

| | | | | |
|---|---|---|---|---|
| 3,954,364 | A | 5/1976 | Talbott et al. | |
| 4,032,394 | A * | 6/1977 | Back | 162/164.1 |
| 4,111,294 | A | 9/1978 | Carpenter et al. | |
| 4,113,812 | A | 9/1978 | Talbott et al. | |
| 4,284,595 | A | 8/1981 | Peters et al. | |
| 4,287,140 | A | 9/1981 | Peters et al. | |
| 4,322,380 | A | 3/1982 | Bleymaier et al. | |
| 4,323,338 | A | 4/1982 | Peters et al. | |
| 4,415,324 | A | 11/1983 | Henckel et al. | |
| 4,432,916 | A | 2/1984 | Logan | |
| 6,376,582 | B1 | 4/2002 | Iwata et al. | |
| 6,624,284 | B1 * | 9/2003 | Biedermann et al. | 528/230 |
| 2002/0176979 | A1 * | 11/2002 | Evans | B29C 70/465 428/292.1 |
| 2003/0165669 | A1 * | 9/2003 | Nowak et al. | 428/212 |
| 2005/0145327 | A1 | 7/2005 | Frankefort et al. | |
| 2008/0081158 | A1 * | 4/2008 | Winey et al. | 428/195.1 |
| 2008/0197536 | A1 * | 8/2008 | Fujii | 264/320 |
| 2008/0245493 | A1 * | 10/2008 | Nishio et al. | 162/146 |
| 2009/0155612 | A1 * | 6/2009 | Pervan et al. | 428/498 |
| 2010/0297425 | A1 | 11/2010 | Gehringer et al. | |
| 2011/0291441 | A1 * | 12/2011 | Burton | B27N 3/04 296/184.1 |

FOREIGN PATENT DOCUMENTS

| | | | | |
|---|---|---|---|---|
| DE | 200 02 744 | U1 | | 2/2000 |
| DE | 19963203 | A1 | | 9/2001 |
| DE | 10344598 | B3 | | 3/2005 |
| EP | 1469140 | A1 | | 10/2004 |
| EP | 1808454 | A2 | | 7/2007 |
| GB | 1267917 | | | 3/1972 |
| JP | 06-031708 | | * | 2/1994 |
| JP | 9158100 | A | | 6/1997 |
| RU | 2016760 | | * | 7/1994 |
| RU | 2 017 597 | C1 | | 8/1994 |
| SU | 1071452 | A | | 11/1981 |
| SU | 1747294 | A1 | | 5/1989 |
| WO | 9747834 | A1 | | 12/1997 |
| WO | 9936623 | A1 | | 7/1999 |
| WO | 0126808 | A1 | | 4/2001 |
| WO | 0301224 | A1 | | 2/2003 |
| WO | 03053642 | A1 | | 7/2003 |
| WO | 2004058465 | A1 | | 7/2004 |
| WO | 2004089585 | A2 | | 10/2004 |
| WO | 2004108374 | A1 | | 12/2004 |
| WO | 2005002817 | A1 | | 1/2005 |
| WO | 2005033204 | A1 | | 4/2005 |
| WO | 2005044529 | A1 | | 5/2005 |
| WO | 2005046950 | A1 | | 5/2005 |
| WO | 2007081685 | A2 | | 7/2007 |
| WO | 2007144718 | A2 | | 12/2007 |
| WO | 2010018142 | A1 | | 2/2010 |

OTHER PUBLICATIONS

Search Report of EPO regarding Belgium Patent Application No. 2007/0507, dated May 16, 2008.

* cited by examiner

BOARD, METHODS FOR MANUFACTURING BOARDS, AND PANEL WHICH COMPRISES SUCH BOARD MATERIAL

This invention claims the benefit of priority under 35 U.S.C. 119 (e) to the U.S. provisional application No. 61/064,192 filed on Feb. 21, 2008.

BACKGROUND

1. Field of the Invention

This invention relates to a board, to methods for manufacturing boards, as well as to panels, more particularly floor panels, which comprise such board material.

In particular, the invention relates to boards substantially consisting of a pressed material mass comprising at least two components, namely a first component consisting of organic material, and a second component functioning as a binding agent, in particular as a binding agent for said first component. By "organic material" is meant that this material has been made from living organisms. Basically, material of vegetable origin is meant, such as wood, cork, grasses, flax, jute, hemp and so on.

2. Related Art

Nowadays, pressed boards in which as a first component, thus, as an organic material, a wood material has been applied, are broadly available and are known by those skilled in the art, for example, under the denominations of oriented strand board (OSB), particle board or wood fiber board, wherein said first component then consists of wood flakes, wood chips or wood fibers, respectively. In said known boards, the second component usually consists of a polycondensation glue, such as melamine urea formaldehyde glue. Amongst others, wood fiber boards of the MDF (Medium Density Fiberboard) or HDF (High Density Fiberboard) type are known. Other examples of boards with an organic component are, for example, flax boards, wherein flax is applied as an organic component.

The aforementioned known boards respectively relate to boards of which the pressed material is made homogenously, i.e. with a fixed composition, in the length and width direction of such board. Quasi inherent to boards which are obtained by pressing an initially homogenous material mass is a density of the obtained board that varies in the thickness direction of the board, which has been created by a not homogenous pressure and temperature distribution in the manufacture thereof.

From the state of the art, it is also known to modify the aforementioned boards in a variety of ways. Such modification then is also performed homogenously. For example, it is known, amongst others, from WO 2005/002817 to incorporate synthetic materials, such as high-density polyethylene (HDPE), in a wood chip board in a homogenous manner.

The aforementioned boards show the disadvantage that the material composition and/or material characteristics of the entire board fulfill conditions which, in most cases, are important for a limited material portion of such board only, which renders these boards unnecessarily expensive. This is the case, for example, with the boards from which floor panels are formed, and in particular with the boards from which laminate floor panels with coupling means, for example, the coupling means known as such from WO 97/47834, are formed. In such boards, the conditions for the board material substantially are determined by the features which are of importance for the material at the edge of the floor panel. Those may be, for example, features as tension strength, density and waterproofness.

From the state of the art, for example, from WO 2004/089585 and WO 2004/108374, some board materials are known, the features of which in the thickness direction of the board are varied in that the board material is constructed with layers of different materials. Such layered construction allows tuning the upper side and/or underside of a board to the intended use thereof, whereas the bulk of this board may be provided with another, for example, cheap, material, such that a well-functioning board is obtained at a preferably lower price. Thus, for example, the surface can be tuned to covering it by means of a laminate top layer. For covering, in many cases a fine surface structure is desired, whereas the material structure within the board may be formed more coarsely.

The aforementioned boards, both the homogenously constructed boards and the layered constructed boards, and then in particular the boards consisting of wood fibers or wood chips connected by polycondensation glue, find many applications, amongst others, in the furniture industry and the flooring industry, where they possibly, whether or not provided with a decorative covering, may be subdivided into smaller panels, which finally may be employed as a furniture panel, wall panel, ceiling panel, floor panel and the like.

From the state of the art, also various techniques are known for treating the edge portion of such smaller panel. For example, it is known from WO 03/12224 to treat the edge portions of the smaller panels into which such board, in the case of said international patent application, for example, a wood fiber board of the HDF (High Density Fiberboard) type, can be subdivided, with an impregnating agent in order to obtain particular features, such as waterproofness at the location of the edge concerned or at least at a portion thereof.

From said WO 03/012224 or from DE 199 63 203, it is also known to treat the pressed board, before subdividing it, with such impregnation agent with the intention of obtaining a modified edge portion on the smaller panels finally formed from such board. To this aim, the pressed material mass is treated differently in the plane of the board. This treatment can be performed in the further processing of the board, for example, immediately before subdividing it, as well as in the production of such board, for example, when the material mass of such board just has been pressed.

Although the techniques known from WO 03/012224 and DE 199 63 203 clearly have advantages, they require an extra treatment of the already pressed material mass and require the introduction of or the impregnation with an agent which is foreign to this pressed material mass, which may lead to various undesired effects. Thus, it is possible that after a certain time the introduced agent leaches out, as there is no or only a limited connection with the pressed material mass. Moreover, by means of a treatment of the already pressed board it is difficult to have the agent penetrate into the core of the board in a sufficient manner. In most cases, only a limited penetration depth will be achieved.

It is noted that from the state of the art also boards are known locally having, in view of economizing material, structural recesses in their material bulk. This then relates, for example, to boards substantially consisting of so-called wood-plastic composite or wood extrusion material. For another example of structural recesses, reference is made to WO 01/26868, wherein then another type of boards than the boards of the present invention is concerned, at least in that in this international application no press operation is applied for obtaining the board.

SUMMARY OF THE DISCLOSURE

The present invention aims at an alternative board, which, according to various preferred embodiments of the invention, can form a better and/or cheaper alternative for existing boards and which possibly may be produced in a simpler manner, whereas the panels finally obtained there from, more particularly the floor panels formed starting from these boards, possibly may have better or similar features than before. To this aim, the invention according to its first aspect relates to a board, wherein this board substantially consists of a material mass which is pressed and which comprises at least two components, namely a first component consisting of organic material, and a second component functioning as a binding agent, more particularly as a binding agent for said first component, with the characteristic that said material mass is realized differently in the plane of the board. Preferably, said organic material relates to a vegetable material. The second component preferably relates to another component than the first component, and preferably the material mass thus is interconnected at least by means of external binding agents, thus not only by means of possible materials which are inherent to the organic material concerned. This latter does not exclude that the respective second component according to the invention may be an external binding agent, which is of organic origin, such as a natural resin or rubber.

Thus, the invention, amongst others, relates to boards having in their length and/or width direction one or more zones with modified material. It is clear that it is the pressed material portion of the board itself which has said differing composition and that a possibly differing composition, which is obtained solely by a treatment, for example, by a treatment with cutting instruments or an impregnating agent, of an already pressed homogenous material mass is excluded. However, it is not excluded that the board according to the invention, apart from the pressed material portion of which it substantially is constructed and which has the differing composition, also comprises one or more other material portions, the composition of which has been modified after pressing. For example, the pressed material mass additionally may be impregnated locally by means of the technique described in the aforementioned WO 03/012224.

It is clear that said different realization relates to an intentional difference in composition and does not relate to production tolerances which possibly may occur in the production of the state-of-the-art boards. For example, it is known that a somewhat other density can be obtained at the edges of MDF or HDF boards, in that the conditions for temperature and pressure supply on the edge of the applied press device are differing slightly. In this respect, it is noted that the different realization preferably manifests at least in a material zone of the board which is bordered by other board material at least in the directions perpendicular to the respective material zone, preferably is bordered by board material of normal composition, which means it is bordered by board material with the composition common to the majority of the board material. It is also clear that said different realization does not relate to accidental thickness differences in boards constructed in layers.

Thus, according to the invention, one works at least with differences in the composition of the pressed material mass, namely either of the organic material or of the binding agent or of both, wherein these differences manifest themselves in the plane of the respective board, in other words, in the length and/or width direction of the board concerned. Such board opens many new possibilities in numerous applications, which will be shown in the following. It is clear that the presence of structural recesses in the board as such does not define a differing composition, but that it is the composition of the material itself which determines this differing composition. The board of the invention preferably is even free of such structural recesses. It may be clear that cavities, such as with a possible porosity, which are inherent to the board material, are not regarded as structural recesses.

According to this first aspect and all following aspects, the invention in the first place is intended for boards of which said first component relates to a wood material, such as wood flakes, wood chips, wood fibers or wood powder. However, the invention may also be applied in other types of boards.

Preferably, said first component according to the invention relates to a fiber material, such as wood fiber, hemp fiber, flax fiber or paper fiber.

As the second component, preferably a synthetic material is used. To this aim, preferably at least the usual glues for such boards can be applied, such as a polycondensation glue, selected from the series of urea formaldehyde glue, melamine glue, melamine formaldehyde glue, methane diphenyl diisocyanate glue, phenol formaldehyde glue, resorcinol formaldehyde glue and resorcinol phenol formaldehyde glue. However, it is also possible that as the second component, a synthetic material is used which is usual for such wood-plastic composites, also known under the denomination of wood extrusion materials. For example, as a second component at least a synthetic material can be applied, chosen from the series of polyethylene, polyethylene terephthalate, polypropylene, polystyrene, polycarbonate, polyurethane and polyvinyl chloride.

In the most preferred embodiment of the present invention according to all its aspects, the board either substantially is made as a wood fiberboard of the MDF or HDF (Medium Density Fiberboard or High Density Fiberboard) type, or substantially is made on the basis of a so-called wood-plastic composite or wood extrusion material, each time possibly with the exception of the material zones where said differing composition occurs in the pressed material mass. For a more detailed description of known wood-plastic composites (English: Wood Plastic Compound or WPC), reference is made to WO 2005/033204. It is noted that the weight ratio of synthetic material to wood in such wood-plastic composites may lie between 70:30 and 20:80, whereas this ratio in MDF or HDF board, as well as with fiberboard or OSB is situated considerably lower. Good values for MDF or HDF are found with a weight ratio of binding agent to wood between 2:98 and 12:88. Both materials, MDF/HDF and wood-plastic composites, also differ by the binding agents applied. In MDF or HDF usually a polycondensation glue is used, whereas for wood-plastic composite, a soft synthetic material is used which solidifies when cooled. For examples of polycondensation glues or synthetic materials which are used as a binding agent in MDF, wood-plastic composite, respectively, reference is made to the preceding paragraph.

According to the invention, said differing composition of the pressed material mass can be obtained according to a variety of possibilities. In the following, the three most important possibilities are discussed.

According to a first possibility, said differing composition consists at least in that the board in its plane, in other words, in its length and/or width direction, has one or more material zones where at least one of said components is present in a differing concentration in comparison to the remainder of the board.

According to this first possibility, in at least one of said material zones said second component may be present in an increased or reduced concentration. Locally increasing the concentration of the second component may result in zones with an increased strength and/or waterproofness, whereas locally reducing the concentration of the second component then may have other useful effects, such as creating a preferred break location at the height of the material zone concerned. Clearly, other effects, such as effects on the density of the material, are not excluded. In the case of a board which substantially is realized as a fiberboard of the MDF or HDF type, in said zones thus more glue or other binding agent may be present than this is the case in the remainder of the board concerned. Such board may be realized, for example, by locally introducing additional glue in a homogenous material mass to be pressed, for example, by spraying glue on this material mass. Preferably, the increased or reduced concentration relates to an alteration in the concentration of at least 5 percent or at least 10 percent. Said first component may or may not be present in the zone concerned in a concentration almost equal to the remainder of the board.

Also according to this first possibility, in at least one of said material zones said first component may be present in increased or reduced concentration. Locally increasing the concentration of the first component may lead to harder zones, whereas locally reducing the concentration of organic particles may lead to very waterproof zones. Of course, other effects are not excluded here. In the case of a board of the MDF or HDF type, in said zones thus more wood fiber may be present than it is the case in the remainder of the board concerned. Preferably, the increased or reduced concentration relates to an alteration in the concentration of at least 5 percent or at least 10 percent.

It is clear that according to the first possibility, also the concentrations of both components can be altered at the location of the material zones concerned. When manufacturing a board of the MDF or HDF type, such alteration of the concentration of both components is simple to perform, certainly in the case where for the first component an equally large concentration increase is performed as for the second component. From the state of the art, it is known how an MDF or HOF board can be realized from a homogenous material mass. To this aim, one starts from a material mass homogenously composed by means of wood fibers provided with binding agent, wherein the HDF or MDF board then is obtained by pressing this material mass, whereby the wood fibers are connected by means of the binding agent present. For realizing a board, wherein the concentration of both wood fibers and binding agent is increased, it now suffices to apply a larger quantity per volume unit of said fibers provided with binding agent in the desired zones of said material mass in respect to the quantity applied in the remainder of the material mass. In this manner, amongst others, after pressing of the material mass a board may be obtained having, at the height of the material zone or material zones concerned, an increased average density in respect to the remainder of the board. It is clear that it is not excluded that boards with locally increased density may also be achieved in another manner.

Further, it is clear that there is basically no upper limit for said alteration in the concentration of the first and/or second component. Thus, it is not excluded that, for example, the concentration of the binding agent and/or the organic material in the material zone concerned is up to one and a half times or even two times higher or lower than in the remainder of the board.

Also in connection with said first possibility, it is possible that at least one of the two components is entirely or almost entirely absent in the zone concerned. Thus, for example, it is possible that the zone concerned is free from the first and the second component, or even that the zone concerned is free from binding agents and/or is free from organic material, wherein this then either relates to the first and/or the second component or not.

According to a second possibility, said differing composition consists at least in that the board, in its length and/or width direction, has one or more material zones where at least one of the aforementioned components has been replaced or supplemented by another organic material, another binding agent, respectively. Thus, for example, it is possible that in the case of an MDF or HDF board, the binding agent in one or more zones is entirely or partially replaced by another binding agent, such that, in other words, the polycondensation glue applied in the MDF board is replaced at least partially or possibly entirely by another polycondensation glue or possibly by a synthetic material usually applied in so-called wood-plastic composites, for example, by a synthetic material chosen from the group of polyethylene, polyethylene terephthalate, polypropylene, polystyrene, polycarbonate, polyurethane and polyvinyl chloride. As an example of this second possibility, in the case of an MDF board, methane diphenyl diisocyanate glue can be applied in the material zone, whereas in the remainder of the board another polycondensation glue, such as MUF glue (melamine urea formaldehyde glue), is applied. It is noted that methane diphenyl diisocyanate glue has good properties which restrict the possible swelling of MDF or HDF in the case of moisture penetration.

It is clear that with this second possibility, not necessarily an increase of the concentration of the first and/or the second component must occur at the height of the zone concerned. This may be the case, for example, when the respective component partially is replaced by another organic material, another binding agent, respectively, at the height of the material zone concerned, however, no additional organic material and/or binding agent is provided.

It is also clear that according to this second possibility also, or only, the organic material can be replaced or supplemented by another organic material. In the case where the first component is replaced entirely or partially by another organic material, the being different of this organic material may express itself in many different manners. So, for example, the shape, the size, the material itself of this first component, or the treatment of this first component can be varied. Therefor, it is not excluded that at the height of the material zone or material zones concerned, a fiber material is replaced by a particle-shaped material. So, for example, said differing composition, in a board substantially made as a MDF or HDF board, may consist at least in that the board, in its length and/or width direction, has one or more material zones where the first component, namely, the wood fiber material, is replaced by wood material with larger dimensions, for example, by larger wood fibers, wood powder, wood chips or wood flakes. Also, wood fibers originating from oak wood or other hardwood may be replaced by fibers substantially obtained from pinewood or other softwood. Another example relates to varying the chip size in the respective material zones of a wood chip board. Another example relates to applying in a MDF or HDF board, according to the material zone, wood fibers, whether or not subjected to an acetylation treatment. Still another example relates to locally introducing cork particles into a wood-based board, such as into a MDF or HDF board.

In the production of a wood fiber board, such as MDF or HDF, this second possibility may be realized, for example, by depositing wood fibers, which are provided with another binding agent, in the respective zone of the material mass to be pressed, during the composition process thereof. So, for example, in the respective zone one may work at least partially or completely with fibers provided with MDI (methane diphenyl isocyanate) glue, whereas in the remainder of the board another glue, such as MUF (melamine urea formaldehyde) glue, is used. According to this second possibility, in a wood fiber board, such as MDF or HDF, the wood fiber material may be replaced or supplemented at least partially with acetylated wood fibers, whether or not provided with a binding agent. By means of both examples, a better waterproofness is obtained at the height of the zone concerned. For a general description of the effect of MDI glue and acetylated fibers, reference is made to U.S. Pat. No. 6,376,582, where such glues and fibers are applied in a homogenous material mass.

According to a third possibility, said differing composition consists at least in that the board, in its length and/or width direction, has one or more material zones where at least a third component is pressed in, which then is not, or at least not in the same concentration, present in the remainder of the board. So, for example, in certain material zones of the board active agents can be pressed in, such as paraffin or silicone. The activity of such agents may be, for example, a moisture-repellent activity, a sound-repellent actively, a lubricating activity, a fire-retarding activity or an activity preventing or reducing crackling sounds. Each of this activities separately as well as in combination of two or more thereof are particularly useful when the respective material zone of the board is intended for finally forming the edge of a floor panel provided with coupling means. In the case that a fire-retarding activity is required, agents such as ammonia phosphate, aluminum phosphate, borax or boric acid can be used. Another example relates to the use of glass fibers, polyimide fibers, polyester fibers, polypropylene fibers or other, not organic, possibly reinforcing fiber materials. In the case of a MDF or HDF board, thus by means of this third possibility the wood fibers can be at least partially replaced or supplemented by glass fibers, carbon fibers, synthetic fibers and the like. This embodiment may lead to a locally increased tension strength or pull-off strength of MDF or HDF. The third component can be provided in any form in the not yet pressed material mass, either in liquid form, or in solid form, for example as granules and/or as fibers, or as a coating provided on the organic material.

It is clear that said third possibility comprises at least part of the embodiments of said second possibility. Further, it is clear that said third possibility, just like the first and the second possibility, leads to many new embodiments of such boards. In the following, three particular embodiments are described in greater detail.

According to a first particular embodiment of the aforementioned third possibility, the third component consists of a solidified hot melt glue (English: hot melt glue). When pressing the material mass, such hot melt glue can melt and mix in liquid form with the remaining components of the board and thereby, after solidification of the hot melt glue, may form a material zone having a good waterproofness and showing a good connection with the remainder of the board. It is noted that such hot melt glue can be applied in the material mass to be pressed in any manner, for example, by placing strips of this hot melt glue beneath, in or on the material mass to be pressed, or by introducing such hot melt glue in the zones concerned in the form of granules and/or fibers, or by providing the organic material of the respective material zone beforehand with such hot melt glue.

According to a second particular embodiment of said third possibility, the third component consists of a foamed or expanded material. For example, it is possible to think of applying polystyrene. Said foaming and/or expanding the material may occur in the press device as well as before and/or after pressing. Such foaming or expanding material preferably is provided in the material mass to be pressed by introducing such materials in the zones concerned in the form of granules and/or fibers. According to this second particular embodiment, a material zone can be obtained which is light-weight and still realizes a good connection at least with the organic material of the board.

In the case that a board with the characteristics of the second particular embodiment is applied for manufacturing floor panels or other panels, it is preferred that said foaming or expanding material is located in zones situated in the bulk of the final floor panel, such that the edges of such floor panel preferably are substantially free from such material. In this manner, a light-weight panel or floor panel can be obtained, which still has sufficient rigidity at its edges for forming, for example, milling, profiled edge portions therein, such as edge portions which comprise coupling means of the type known as such, for example, from WO 97/47834. Also, in furniture panels it may be interesting to keep the edges entirely or partially free from such material, for example, in view of obtaining a good edge finish, such as an edge finish obtained by means of a milling process, a sawing process, and/or obtained by providing a decorative covering at those edges.

It is noted that it is not excluded that other beneficial effects, such as hydrophobicity, can be achieved when the foaming or expanding material is provided at least at one or more edges, or substantially is only provided at one or more edges.

Applying a third component consisting of a foamed or expanded material in a board, wherein this board substantially consists of a material mass which is pressed and wherein this material mass comprises at least two components, namely a first component consisting of organic material, and a second component functioning as a binding agent, more particularly as a binding agent for said first component, as such also forms a particular independent aspect of the present invention, independent from the fact whether this foamed or expanded material, as in the first aspect, is situated in material zones or rather is concentrated in one or more layers, or is spread more or less homogenously within the board.

It is clear that a board with the characteristics of the particular aspect can be realized very light-weight, whereas the presence of the organic material connected by means of binding agent still can provide for sufficient rigidity. According to this particular independent aspect, this preferably concerns a board wherein the organic material thereof substantially consists of wood particles, preferably wood fibers, and/or wherein the binding agent substantially consists of a polycondensation glue selected from the above-mentioned examples thereof.

Fibrous organic components as such have a more suitable form for being taken up into the foamed material and forming a strong bond therewith.

As the third component, according to the present particular independent aspect, the already above-mentioned polystyrene may be used, which can be obtained by expanding polystyrene granules which are situated in the material mass to be pressed and whether or not are already partially expanded. As already mentioned, the activation, namely foaming and/or expansion, of the respective material may occur in the press device as well as before and/or after pressing.

In the case that such foamed or expanded material is concentrated in one or more layers, a board may be obtained showing at its surface the normal composition of, for example, MDF or HOF or particle board, whereas in the center of the thickness of such board said foamed or expanded material is applied. Such board results in a board which can easily be processed at its surface by means of known techniques, for example, easily be laminated, but which still is light-weight in that it comprises such foamed or expanded material. According to another example, a board can be obtained wherein the respective layers are situated closer to the top and/or bottom surface and wherein in the center of the thickness of such board, material with the usual MDF or HDF or particle board composition is situated. With such board, for example, sound-dampening or other effects may be obtained by the presence of the foamed or expanded material, whereas the edges still can be simply processed by known techniques, for example, simply milled or masked in that here the usual MDF, HDF of particle board material can be used. This latter advantage is particularly important for floor panels, more particularly laminate floor panels, which form part of a floating floor covering. In such floor panels, the production of sound, such as the production of ticking sounds when being used is experienced as annoying. Herein, said milling treatment then is applied at least for forming mechanical coupling means at the edges, which coupling means allow to couple two or more of such floor panels to each other, and by which a locking can be formed among two of such floor panels in a vertical direction perpendicular to the plane of the coupled floor panels, as well as in a horizontal direction perpendicular to the coupled sides and in the plane of the coupled floor panels.

According to the present particular aspect, it is possible that said third component simultaneously fulfills the function of the second component and that, for example, no separate binding agent is provided in the board. Such board material may be paraphrased as a board material on the basis of solidified foam, wherein an organic material is applied as filler. However, according to this particular aspect preferably a separate binding agent, such as a polycondensation glue, is applied with the intention of obtaining a good form stability and mechanical strength.

In the aforementioned second particular embodiment of the third possibility as well as in the above-mentioned particular independent aspect of the invention also a foam on the basis of melamine and/or another amino resin may be used as the foaming component. Such embodiment is of particular interest when the binding agent also relates to a polycondensation glue on the basis of melamine and/or another amino resin. Amino resin foams are known as such, for example, from EP 1 808 454; however, up to date such foams in fact are not applied in combination with an organic filler of the type of wood powder, wood fibers, wood chips or wood flakes, wherein, as already mentioned above, particular effects can be achieved by wood fibers.

According to a third particular embodiment of said third possibility of the first aspect, the third component consists of a colorant or another, whether or not visual, recognition means. Other than visually recognizable means are, for example, magnetically, electrically and/or thermically recognizable means. By the embodiments of this third particular embodiment, processing of such boards can be simplified or automated to a large extent. An example of such recognition means is iron filings, which is at least magnetically recognizable.

Within the scope of the invention, it is of course possible that said three possibilities are combined in any manner.

It is noted that, where a concentration or quantity of a certain component is mentioned, this concentration must be expressed as a weight per volume unit, for example, in grams per cubic centimeters or kilograms per cubic meter, and that this concentration has to be determined over the entire thickness of the board or the material mass to be pressed in the material zone concerned, wherein possible structural recesses are not included in the thickness. It is clear that the material zones in the context of the present invention have a certain width and that said concentration thus can not be determined on a line across the thickness of the board.

Preferably, the areas of differing composition are material zones which clearly are wider than 5 percent of the thickness of the material mass or of the thickness of the board, or even are wider than 10 percent thereof.

It is clear that it is not excluded that the boards of the present invention comprise structural recesses, such as, for example, structural recesses of the type known from WO 01/26868.

It is also noted that also according to another possibility said differing composition consists at least in that the material mass has one or more zones, the porosity of which is smaller or larger than in the remainder of this material mass or board. So, for example, one may strive for that material zones intended for forming an edge of a final panel have a smaller porosity, such that they, for example, are less subjected to water penetration and/or water infiltration.

According to a practical embodiment of the first aspect of the invention, it is preferred that said differing composition manifests itself at least in material zones aligned according to said length and/or width direction of the board. This is advantageous in particular when the board is intended to be subdivided into several smaller panels, such as rectangular or almost rectangular panels. In such case, said material zones with differing composition can be intended for forming at least a portion of said smaller panels. In the most preferred embodiment, said board is intended for being divided into oblong panels with a pair of opposite long edges and a pair opposite short edges, such as it may be the case with panels for producing floor panels, wherein said material zones then preferably are intended for forming at least a portion of a long edge of said panels. Still better, said material zones are pressed into the board at such a location that the circumference of each of said panels into which the board is divided, is formed by such material zone.

According to said practical embodiment of the first aspect of the invention, it is thus possible to provide in the board material zones with features attuned to the required characteristics for an edge area of the panels, which panels are obtained from such board by subdividing it. So, for example, it is possible to provide for that the final panels have an increased density, strength and/or waterproofness at their edge. This is of particular interest in the case that in the remainder of the board a porous and/or brittle material, such as MDF or HDF, is used and that one desires to obtain improved characteristics at least at the edge of the final panels, whereas these improved characteristics are redundant for the bulk of the panel. It is clear that in this manner an improved floor panel can be obtained at a restricted cost price, without an additional charge or even at a better price.

Said practical embodiment may be usefully applied, for example, in floor panels with coupling means provided at least partially in said board material, for example, coupling means of the type known as such from WO 97/47834 and allowing a horizontal and vertical locking of the panels. So, for example, the strength of the connection may be increased by modifying the material on the edge and/or, amongst others, in floor panels with an impenetrable top layer, such as a laminate top layer, an improved water-repellency can be obtained by modifying the material on the edge of the panels, whereas in both cases the interior material of the panels remains unaltered.

According to the invention, it is preferred that the material zones with a composition that differs according to the invention, projected into the board surface, covers the smallest surface of the board. Preferably, this surface is less than half of the surface of the material mass of normal composition, and still better is less than 20 percent of this surface.

It is noted that a differingly composed material zone, according to all aspects of the invention, is regarded as a material portion of the board extending in the respective zone over the entire depth of the board, as, even when a portion of normally composed pressed material mass is situated in this zone and when other pressed material is provided, for example, solely at the surface, then the totality of the material of this zone, regarded over the depth, is composed otherwise.

In a preferred embodiment of the first aspect, the invention also relates to a board, for example, a board substantially constructed as a MDF or a HDF board, wherein said differing composition consists at least in that the board, in its length and/or width direction, has one or more material zones with a locally higher or lower density. This embodiment is very useful for boards intended for being subdivided into panels for the production of floor panels with coupling means, as the density of the edge then can be attuned to the function of the coupling means, and/or for panels for the production of floor panels with a thin top layer, i.e. top layers with a thickness of smaller than 2 or 1 millimeter, such as a laminate top layer or a veneer top layer, as the density of the edge in such thin top layers determines the tendency of forming so-called upstanding edges. Herein, this preferably relates to a difference in density of at least 5 percent and still better of at least 10 percent. It is noted that such locally increased or reduced densities possibly can also be obtained in another manner than by providing a pressed material mass with differing composition. Therefore, the invention, according to an independent second aspect, also relates to a board, wherein this board substantially is constructed of composite material consisting at least of two components, namely a first component consisting of organic material, and a second component functioning as a binding agent, more particularly as a binding agent for said first component, wherein said board, in its width and/or length direction, has one or more material zones, at the height of which said composite material is realized differently in respect to the remainder of the board, with the characteristic that said different realization consists at least in that the composite material has another density at the height of the material zone concerned. Here, too, it is clear that this does not relate to accidental density differences as a result of possible tolerances.

According to the second aspect of the invention, said other density can be obtained in many possible manners, namely:

- at least in that at least one of said components has an increased or reduced concentration at the height of the zone concerned. To this end, as an example also reference is made to the first possibility for material zones with differing composition mentioned in the first aspect.
- at least in that said organic material is replaced and/or supplemented by other organic material and/or at least in that said binding agent is replaced and/or supplemented by another binding agent. To this end, as an example also reference is made to the second possibility for material zones with differing composition mentioned in the first aspect.
- at least in that a third component is introduced into the composite material. To this end, as an example also reference is made to the third possibility for material zones with differing composition mentioned in the first aspect.
- in that a combination of two or more of the aforementioned three possibilities is applied.

It is clear that also the second aspect of the invention can be applied particularly useful with board material substantially composed as so-called MDF or HDF material or with board materials composed on the basis of wood-plastic composite or so-called wood extrusion material.

According to a third independent aspect, the invention also relates to a method by which, amongst others, the boards of the first and/or the second aspect can be manufactured. To this aim, the invention relates to a method for manufacturing boards, wherein one starts from a material mass composed at least by means of two components, namely a first component consisting of organic material, and a second component which is a binding agent, and wherein said board is at least obtained by pressing the material mass and interconnecting said organic material by means of said binding agent, with the characteristic that said material mass, in its width and/or length direction, has one or more zones, at the height of which its composition is realized differently in respect to the remainder of the material mass.

According to the third aspect of the invention, the material mass thus is composed such that, at least before it is being pressed, it shows zones, the composition of which is realized differently. Preferably, the surface of such zones is less than half of the total surface of such material mass, and even preferably less than half of the surface of the normal material mass. In other words, the composition of the material zone concerned preferably is common to less than half of the material mass, whereas preferably at least half of the material mass has a common composition.

Surprisingly, the inventors have found that it is possible to compose the material mass to be pressed in a inhomogenous manner in its width and/or length direction and preferably form a board from it without too many problems. The inventors were particularly surprised to find that this is also possible when manufacturing MDF or HDF, and such in particular in a continuous manufacturing process. Normally, one strives to compose wood fibers previously provided with glue as uniformly as possible in layers to form a so-called mat or material mass. However, the inventors broke this paradigm by applying other compositions of the material mass in length and/or in width direction. The new inventive method of the present invention according to its third aspect opens many new possibilities. Amongst others, it allows to manufacture the inventive boards of the first and the second aspect in an economical manner.

According to the third aspect of the invention, thus at least differences in the composition of the material mass are applied, namely either of the organic material or of the binding agent or of both, wherein these differences manifest themselves in the plane of the material mass concerned, in other words, in the length and/or in width direction of the material mass concerned. It is clear that the presence of recesses in the material mass, which are intended for forming structural recesses in the final board, as such do not define a differing composition, but that it is the composition of the material mass itself which determines this differing composition. The board which is obtained according to the invention preferably even is free from such structural recesses. It may be clear that cavities, such as with a possible porosity, which are inherent to the board material, are not regarded as structural recesses.

The method of the third aspect can be performed according to various possibilities.

According to a first possibility, said material mass is composed such that it has at least one zone where at least one of said components is provided in a different quantity or concentration. This embodiment may be obtained by locally removing material from a possibly homogenously composed material mass, or by locally adding material on such material mass.

According to a second possibility, said material mass is composed such that it has at least one zone where at least one of said components has been replaced or supplemented at least partially by other organic particles, another binding agent, respectively. So, for example, synthetic material locally may be added to the typical material mass for a MDF board, for example, it may be strewn onto the wood fiber mat in the form of granules or may be provided or blended therein. Herein, this may relate, for example, to synthetic materials usually applied with wood-plastic composites. According to another example, the wood fiber mat for manufacturing a MDF board locally may be composed of fibers differently provided with glue, such as fibers provided with methane diphenyl diisocyanate glue, whereas the remainder of the fibers is provided with glue by another polycondensation glue, such as MUF glue (melamine urea formaldehyde glue).

According to a third possibility, said material mass is composed such that it has at least one zone where at least a third component is provided. Herein, said component may be added to the material mass in liquid as well as in solid form. In the case of addition in solid form, the respective component can be supplied in the form of granules or fibers. According to a particular embodiment of this third possibility, the third component provided in the material mass, when pressing the material mass, can diffuse at least partially into the actual board material, for example, in that this third component starts to flow and/or melt in the press device.

This may be the case, for example, when a hot melt glue is applied as the third component.

It is clear that the method is intended in particular for manufacturing boards of which said first component relates to a fiber material, and/or for manufacturing boards of which said first component relates to a wood material, and/or for manufacturing boards of which said second component relates to a synthetic material. In the most preferred embodiment, said board substantially is made as a fiberboard of the MDF or HDF type.

Said material mass can be composed such that one or more of said zones are aligned according to said length and/or width direction. It is noted that the method of the third aspect preferably is applied for manufacturing boards which are intended to be applied for manufacturing floor panels, such as laminate floor panels, wherein then preferably by means of the differing composition of the material mass, modified material areas are obtained at the edge of the final floor panels.

It is clear that the method of the third aspect can be applied for manufacturing a board with the characteristics of the first and/or the second aspect and/or the preferred embodiments of these aspects. Further, it is clear that the invention also relates to a board which is obtained by such method.

The invention further also relates to a particular method for manufacturing boards having material zones of differing composition. To this end, the invention, according to its fourth aspect, relates to a method for manufacturing boards, wherein it is started at least from a material mass composed at least by means of two components, namely a first component consisting of organic material, and a second component which is a binding agent, more particularly a binding agent for said first component, and wherein said board is obtained at least by pressing the material mass and by interconnecting said organic material by means of the binding agent, with the characteristic that said material mass comprises at least a component which, after having been provided in the material mass, locally is activated or deactivated. Preferably, said activation or deactivation provides for that the final board or the panels into which this board is divided comprises one or more material zones of differing composition. It is clear that the respective activatable or deactivatable component may relate to the first, the second as well as possibly a third component.

It is possible that the binding agent forms said activatable or deactivatable agent, wherein this binding agent preferably is solidified or is removed locally, for example, chemically by locally spraying an agent on the material mass which can render the respective binding agent soft or can disintegrate it, or, for example, by means of electro-magnetic radiation by locally radiating or exposing the pressed material mass.

It is also possible that said activatable or deactivatable agent is a component of a two-component system, wherein this agent then can be activated, for example, by bringing it locally into contact with the second component. An example of a possible two-component system is polyurethane, wherein then preferably as a first component a component on the basis of polyol and as a second component a component on the basis of isocyanate is applied.

According to the method of the fourth aspect, it is possible that this activatable component is homogenously provided in said material mass, but is activated only locally.

It is clear that the activation or deactivation can be obtained in any manner, either by the influence of an agent, or by the influence of heat, radiation or light, or by the influence of mechanical or electromagnetic forces. The activation or deactivation may occur at any moment. It may be performed, for example, either on the not yet pressed or on the pressed material mass, in other words, on the board obtained by pressing, or on smaller panels obtained from the pressed material mass at least by subdividing. In the case of boards which are applied when manufacturing floor panels, the activation or deactivation can be performed such that the edges of the floor panels consist at least partially of activated or deactivated material mass.

Further, it is clear that by means of the method of the fourth aspect boards can be manufactured with the characteristics of the first and/or second aspect and that the invention also relates to boards obtained by a method with the characteristics of the fourth aspect.

The invention of the fourth aspect may offer a very useful, smooth and flexible method for manufacturing novel boards, such as for manufacturing the boards of the first and/or the second aspect. Of course, the method of the fourth aspect may also show the characteristics of a method according to the third aspect of the invention.

According to the fourth aspect, the activation at least may relate to expanding of foaming a component present in the material mass. Herein, this may concern, for example, forming polystyrene starting from polystyrene granules, wherein then a board material is obtained which also shows the characteristics of the also above-mentioned particular aspect of the invention. It is clear that such foaming or expanding component can be present in one or more material zones and/or material layers as well as can be present more or less homogenously in the material mass. By foaming such component, particularly light-weight boards can be obtained, and moreover new possibilities for the board material can be achieved. So, for example, may the thickness of the final board be adjusted by keeping the board fixed during foaming of the respective component, for example, in a mold or between press elements. A further possibility herein is that a semi-finished product can be provided wherein the foaming component is not yet or only partially expanded or foamed, such that the thickness of the final board material still can be adjusted as desired when expanding said component. Such semi-finished product, the thickness of which, possibly within certain limits, still can be adjusted has a huge potential for the reduction of stocks. Thus, according to a fifth independent aspect, the invention also relates to a semi-finished product for forming a board, characterized in that the semi-finished product comprises an expandable or foamable component. Such semi-finished product preferably consists of a pressed material mass comprising at least organic material and a binding agent. The organic material preferably relates to wood particles, such as wood fibers. The binding agent may be polycondensation glue and may be selected, for example, from the above-mentioned possibilities thereof, or may relate to a synthetic material of the type usually applied in wood-plastic composite. It is clear that the semi-finished product as such already has a stable plate form. Another possibility with the semi-finished product of the fifth aspect is that by the application of a mould, a board with a structure or relief can be obtained by means of foaming.

The invention also relates to smaller panels obtained by subdividing the boards of the invention, wherein one or more of the cut or saw lines applied for this division may or may not coincide with the material zones of differing composition, more particularly the invention relates to such panels which can be applied or are applied as a substrate or a portion of a substrate in a floor panel, wherein this floor panel has a top layer provided on this substrate and preferably shows coupling means formed in one piece with the substrate, at least at two opposite edges or at all opposite edges, with which coupling means preferably a locking between two of such floor panels can be obtained in a vertical direction perpendicular to the plane of the floor panels as well as in a horizontal direction perpendicular to the coupled sides and in the plane of the coupled floor panels. The invention is of particular importance for this kind of floor panels, as the boards of the invention allow that the substrate can show optimized material features on the edge of the floor panel, which features, for example, are attuned to the function of the coupling means and/or which offer a better waterproofness. In particular, the invention is of importance for floor panels of which the substrate substantially consists of MDF or HDF. Any material can be applied as a top layer. This may relate, for example, to a laminate top layer, a top layer substantially consisting of lacquer and ink, for example, obtained by a direct printing process, a veneer top layer or a top layer consisting of a thicker layer of wood than veneer. In the case of laminate, one may work with so-called DPL (Direct Pressure Laminate) as well as with HPL (High Pressure Laminate), which laminates comprise carrier sheets provided with resin, amongst which a decorative layer with a pattern.

It is clear that the boards of the invention may have various applications. As already mentioned above, they ma be applied for manufacturing floor panels, however, may also be applied when manufacturing furniture, doors or other decorative or constructional elements composed or consisting of one or more board-shaped parts. In particular in respect to furniture and doors, it is noted that those may be realized particularly light-weight by means of foamed or expanded components.

BRIEF DESCRIPTION OF THE DRAWINGS

With the intention of better showing the characteristics of the invention, hereafter, as an example without any limitative character, several preferred embodiments are described, with reference to the accompanying drawings, wherein.

DETAILED DESCRIPTION OF PREFERRED EMBODIMENTS OF THE INVENTION

Figures 1, 2, 3:
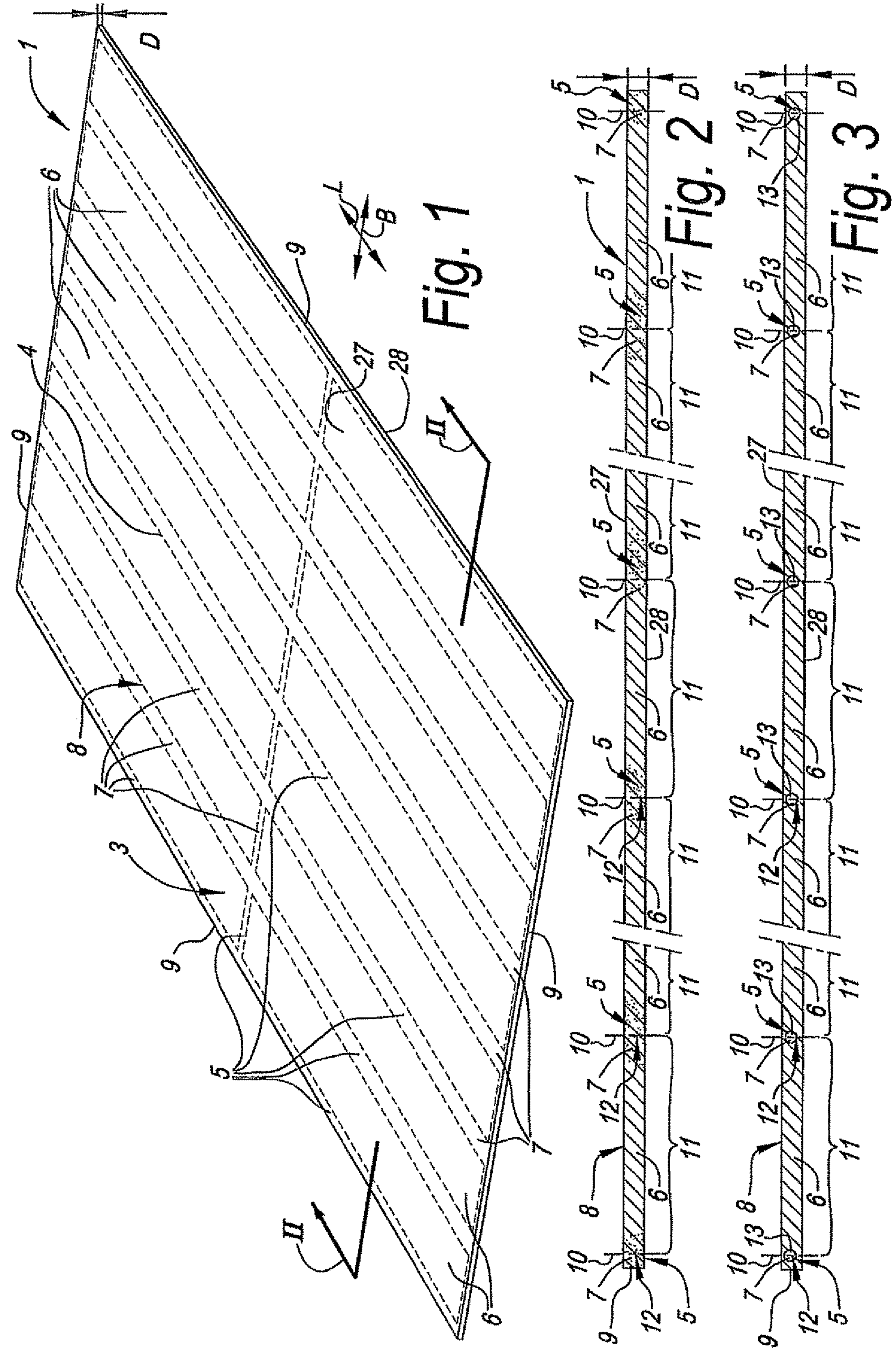
FIG. 1 represents a board with the characteristics of the invention.
FIG. 2, at a larger scale, represents a cross-section according to the line II-II indicated in FIG. 1.
FIG. 3, in the same view, represents a variant of said board.

FIG. 1 represents a board 1 which substantially consists of a pressed material mass 2, wherein this material mass 2 is differently composed in the plane 3 of the board 1, in other words, according to its length direction L and/or width direction B. The example relates to a so-called MDF or HDF board 1, which substantially is composed of wood fibers provided with a binding agent, more particularly is composed of wood fibers interconnected by means of polycondensation glue. Herein, the differing composition required according to the invention occurs in the material zones 5 indicated by dashed line 4.

From FIG. 1, it is clear that according to the invention it is preferred that said differing composition manifests at least in material zones 5 which are aligned according to said length direction L and/or width direction B. According to the example, said material zones 5 are applied both in length and in width directions L-B, and every material portion 6 of the normally pressed material mass 2 is surrounded by a material portion 7 of the differently pressed material mass 2. It is clear that said material zones 5 of differing composition also may be performed solely in the length direction L or solely in the width direction B, wherein then strips or board portions are created, which are flanked at least at one side by a material portion 7 of differing composition.

FIG. 2 shows that the board 1 of FIG. 1 has the features that the differently composed material in this case extends over the entire thickness D of the respective material zones 5 and that the surface 8 of the board 1 is formed by normally pressed material portions 6 as well as by differently composed pressed material portions 7. These two features, each apart as well as in combination, are preferred practical features, which can be applied in a useful manner, amongst others, in boards which are intended for being subdivided into smaller panels, and in particular in boards which are intended for being subdivided into panels which are applied or can be applied as a substrate for the manufacture of floor panels with a top layer. In connection with the first-mentioned feature, it is clear that the differently pressed material portions 7 in this manner possibly form at least a portion or the entire circumference of the final panel over the entire thickness D thereof, whereas the normally pressed material portions 6 usually are cheaper and can be applied as a bulk material for the floor panel. In connection with the second feature mentioned, it is clear that the fact that the surface 8 of the board 1 is formed at least by normally pressed material portions 6 and differently composed pressed material portions 7 can be applied usefully in a variety of manners, for example, for the, whether or not automatic, recognition of the boards 1 of the present invention.

The example of FIG. 2, by means of the dash-dotted lines, clearly shows the locations where cutting lines 10 are intended for being applied for subdividing the board 1 into smaller panels 11. From this, it becomes clear that said differing composition manifests itself at least in material zones 5 which are intended for forming at least a portion of an edge 12 of the aforementioned smaller panels 11. In this case, the board 1 of FIG. 1 is intended for being subdivided into rectangular oblong panels 11 with two pairs of opposite edges 12, and said material zones 5 are intended for forming at least a portion of a long edge or even the entire circumference of said smaller panels 11.

It is clear that said differing composition of the material zones 5 may consist, amongst others, of the first, second or third possibility mentioned in the introduction or of any combination of one or more of these possibilities. It is also possible that the differing composition represented here results in a board 1 with the characteristics of the second aspect of the present invention, wherein the material portions 7 of differing composition then preferably have a higher density than the normally pressed material portions 6.

FIG. 3 represents another example of a board 1 with the characteristics of the invention. Herein, the differing composition of the material zones 5 concerned substantially consists of inclusions 13 of any kind, such as an inclusion of synthetic material or metal, provided in the board 1. By such inclusion 13, various advantages may be obtained. So, for example, is it possible to provide for that the edge 12 of the smaller panels 11 obtained by subdivision is formed at least partially or even substantially by said inclusion 13. If the inclusion 13 is formed from synthetic material, then a synthetic material from the series of polyethylene, polyethylene terephthalate, polyurethane, polypropylene, polystyrene, polycarbonate and polyvinyl chloride can be selected. Also, an inclusion 13 of a wood-plastic composite can be chosen, preferably on the basis of at least one of the aforementioned synthetic materials, wherein then wood particles, such as wood powder, wood chips or wood fibers are applied as fillers. This latter is a possibility which can be considered in particular in the case that the board 1 substantially consists of MDF or HDF material, wood particle board or OSB.

Figure 4:
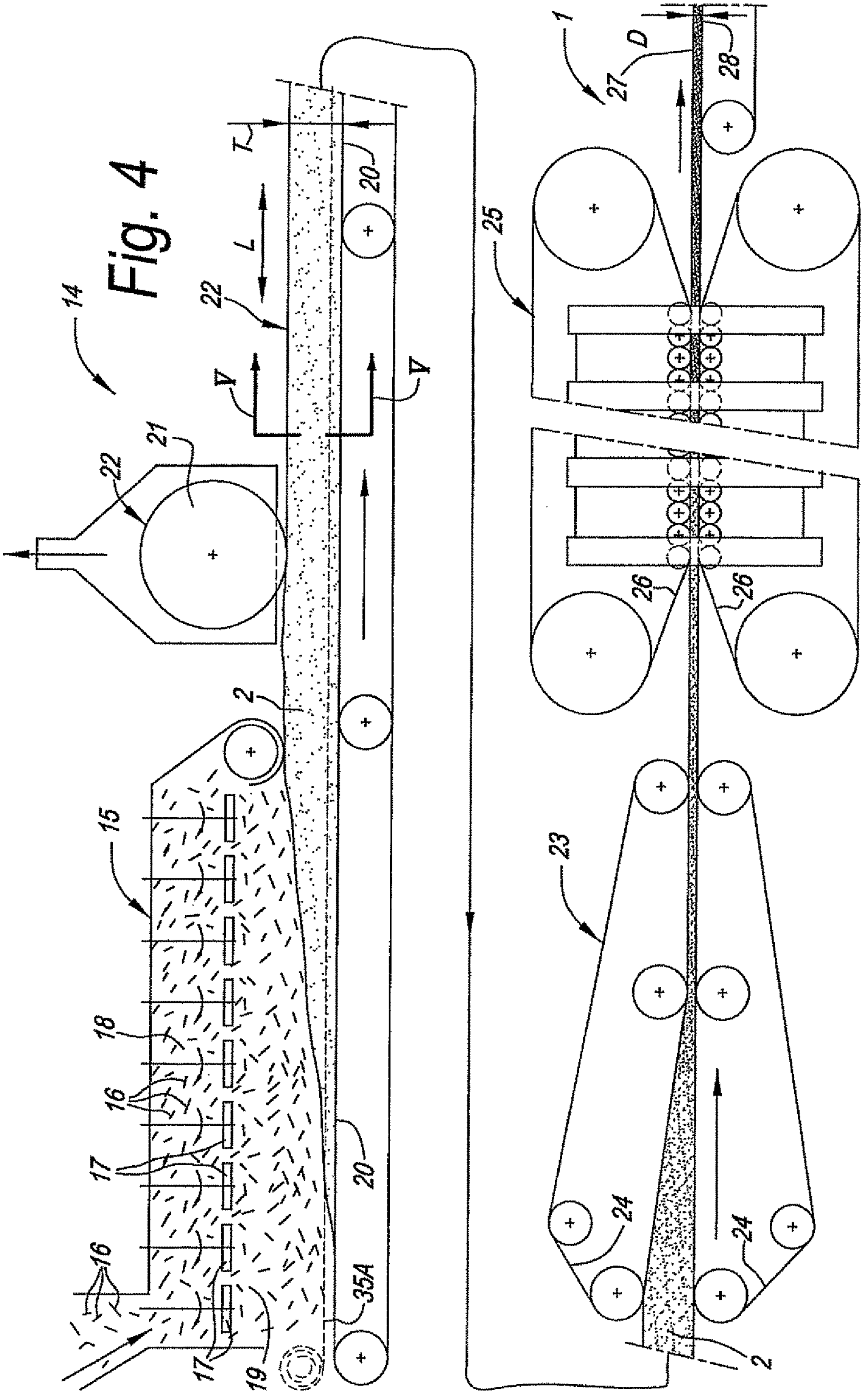
FIG. 4 represents a method with the characteristics of the invention.

FIG. 4 represents a method for manufacturing a board 1, wherein this method shows the characteristics of the third aspect of the invention. In the example, this relates to a method performed by means of a production line 14 substantially corresponding to a typical MDF or HDF production line. Herein, it is started from a material mass 2 which is composed at least by means of two components. In this case, both components simultaneously are supplied to a strewing machine 15 in the form of organic material 16 previously provided with binding agent, in this case in the form of wood fibers provided with polycondensation glue, wherein then said binding agent or the condensation glue forms the second component mentioned in the third aspect and the organic material 16 or the wood fibers form the first component mentioned in this aspect. Of course, it is possible that the second component or the binding agent is added separately to the material 2, for example, by spraying or moisturizing in any other manner the organic material 16 with the respective binding agent during the construction of the material mass 2.

The depicted strewing machine 15 can be constructed in any manner. In the example, a strewing machine 15 is applied such as the one known as such from WO 03/053642. The strewing machine 15 of the example is provided with several agitating elements 17, which bring the organic material 16, which is provided with glue, into movement in the strewing chamber 18. By means of the fibers exiting the strewing chamber at the bottom side 19, the mat or material mass 2 mentioned in the third aspect, or at least a portion thereof, is composed on the transport conveyor 20 situated there beneath. For a further description of such strewing machine 15, reference is made to the aforementioned international patent application. Of course, also other types of strewing machines 15 are suitable, such as, for example, the strewing machines described in the international patent applications WO 99/36623 and WO 2005/044529.

Figure 5:
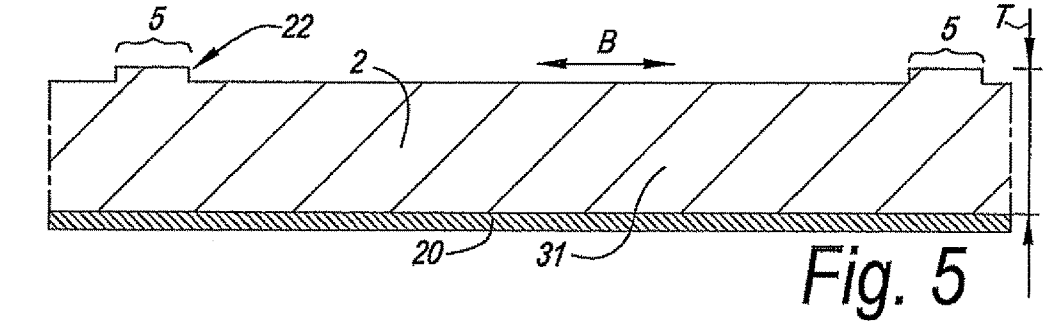
FIG. 5, at a larger scale, represents a cross-section according to the line V-V indicated in FIG. 4.

FIG. 5 shows that the finally obtained composed material mass 2, before being pressed according to the invention to a board 1, in this case shows several zones 5 in its width direction B, at the height of which zones its composition in respect to the remainder of the material mass 2 is realized differently. In this case, the different realization consists at least in that the material mass 2 locally comprises a larger quantity of organic material 16 provided with glue, in particular fibers provided with glue. Such material mass 2 can be composed in many ways. So, for example, it may be composed by a special strewing procedure, which allows strewing locally more, for example, by means of an additional strewing machine strewing solely at the height of the aforementioned zones 5, or by means of a strewing machine 15 which is able to dose additional material in the material mass 2 on certain locations. According to another example, which is applied here, material can be removed from a substantially homogenously strewn material mass 2, such that the profile of the material mass 2 from FIG. 5 is obtained. This may be performed, for example, by means of the so-called scalper roll 21 situated downstream of the strewing machine 15. It is noted that a scalper roll 21 according to the state of the art is applied for scraping off possible excess fibers from a strewn material mass, after which then, also according to the state of the art, a material mass 2 with a quasi flat upper surface is obtained. However, the inventors have found that by providing this scalper roll 21 with a profile, they could provide at least the upper surface of the material mass 2 with a structure 22, wherein this structure 22 then automatically may result in a material mass 2 having one or more zones 5, at the height of which its composition is realized differently in respect to the remainder of the material mass 2.

It is noted that the invention according to a further independent aspect thereof also relates to a scalper roll 21 for manufacturing boards 1 obtained from a pressed material mass 2, with the characteristic that said scalper roll 21 is provided with a structure with which said material mass 2 can be provided with a corresponding structure 22 before the material mass 2 is pressed to form said board 1. It is clear that said scalper roll 21 preferably is applied in a production line 14 for manufacturing a MDF or HDF board 1, which either does or does not show the characteristics of the remaining aspects of the present invention. As a variant of the present independent aspect, instead of a scalper roll 21 also another profiled element, which can provide the material mass 2 with a structure 22, can be used, for example, with a whether or not curved profiled plate element.

It is noted that the material mat or material mass 2 obtained by strewing may have a thickness T which is up to 50 times or more larger than the thickness D of the board material finally to be obtained, as it can be densified and pressed to the required thickness D of the board in further steps of the manufacturing process. These further steps are shown schematically in FIG. 4.

In the production line 14 depicted in FIG. 4, downstream after said whether or not profiled scalper roll 21, further also a densification device or pre-press 23 is situated, in which the composed material mass 2 prior to the actual hot pressing gradually is densified to a condition in which it can be transported in a simpler manner compared to the un-densified strewn material mat 2. To this aim, the material mass 2 preferably is transported between press belts 24 having an intermediate space which decreases in downstream direction. In this pre-densification, preferably no heat is supplied, and/or preferably the binding agent present is not yet or only partially activated. Rather, in the pre-densification preferably an at least partial removal of the gasses present in the material mass 2, such as air, is concerned.

After the densification device or pre-press 23, in FIG. 4, seen in downstream direction, there is the actual press device 25, in which the material mass 2, whether or not already pre-densified, is pressed under the influence of heat. The applied temperature may lie, for example, between 100 and 150° C., and the applied pressure may lie on average between 4 and 10 bar; herein, however, short peak pressures up to 40 bar are not excluded. Preferably, the activation of the binding agents takes place in this press device 25. In the case of polycondensation glue, water or rather steam can be created in this press device.

The press device 25 depicted here is of the continuous type, wherein the material mass 2 is transported between press belts 26 and gradually is pressed. In the pathway of such press device 25, a pressure and/or temperature regime may be set. It is clear that the method of the third aspect can also be performed with other press devices 25, such as, for example, with a steam pressure press, a multiple opening press or with a so-called short-cycle press. In these other press devices 25, the applied pressure and/or temperature can be set in function of the time during which the material mass concerned remains in the press device.

After the actual press device 25, preferably a board 1 with two substantially flat panel sides 27-28 is obtained, however, wherein the originally profiled material mass 2 of the present example is pressed to a board 1 showing the characteristics of the first and/or of the second aspect of the invention. Such board 1 may be subjected to a number of treatments in order to finish the pressed board 1. So, amongst others, it can also be ground at one or both of its flat board sides 27-28.

The method of the third aspect preferably is used for manufacturing boards 1 with a nominal thickness D of 5 to 15 millimeters.

It is also noted that the method of the third aspect, as it is the case in FIG. 4, preferably comprises at least the steps of strewing at least a portion of said material mass 2, pre-densifying or de-gassing the material mass 2 and pressing the material mass 2, and that said different realization of the material mass 2 preferably is obtained before said pre-densification step is performed. Preferably, a production line is chosen which substantially corresponds to the production lines known for manufacturing particle board or wood fiberboard of the MDF or NDP type. Apart from the devices represented in FIG. 4, such production line may also comprise other devices, such as an installation for providing binding agent on the organic material, or a grinding installation for grinding away the outermost layers of the pressed boards.

Figure 6:
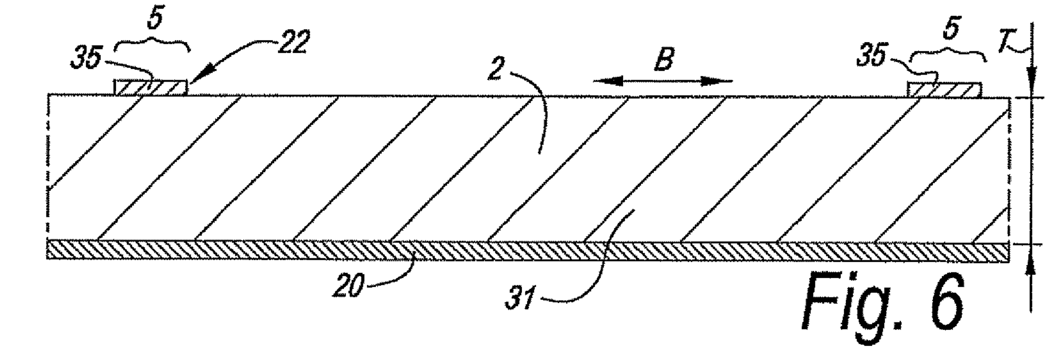
FIGS. 6 to 9, in the same view as FIG. 5, represent variants.

FIG. 6 shows that it is possible to compose the material mass 2 such that it has one or more zones 5 where at least a third material or component has been applied. In the represented case, this is obtained by depositing said third material or component on the surface of a practically homogenous material mass 2, by which again a material mass 2 to be pressed with a profiled upper surface is obtained.

Figure 7:
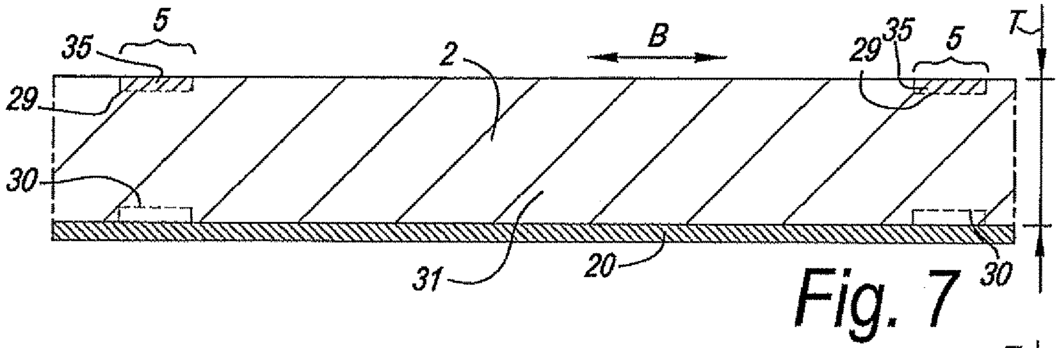

FIG. 7 shows that it is also possible to apply a third material or component by initially providing an original material mass 2 with recesses 29, which then can be filled at least by means of said third component, such that preferably again a flat material mass 2 to be pressed is created. It is clear that these recesses 29, as discussed in respect to FIG. 5, can be formed, for example, by strewing or by profiling a homogenously strewn material mass 2, for example, by means of a profiled scalper roll 21. In dashed line 30, it is shown that it is also possible, whether or not in combination with the possibilities of FIGS. 5 to 7, to introduce the third component into the lowermost portion of the material mass 2, in this case at the bottom of the material mass 2. To this end, this third component, for example, may be provided first on the conveyor belt 20, after which the remainder of the material mass 2 then is composed, for example, by homogenous strewing glue-provided organic material 16.

It is noted that a similar composition as the material mass 2 from FIG. 7 can be obtained by other methods than by filling recesses 29 formed in the material mass 2. So, for example, may such material mass 2 be obtained by pre-densifying a material mass 2 similar to that from FIG. 6.

Figure 8:
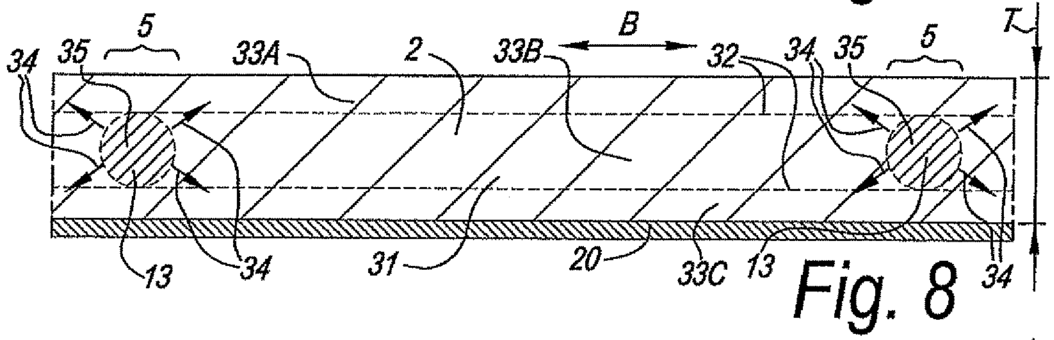

FIG. 8 shows that it is possible to compose the material mass 2 such that it comprises one or more zones 5, where a third component is provided on a location in the bulk 31 of the material mass 2, in other words, on a location where this third component is surrounded by the actual material of the material mass 2. Such embodiment may be obtained, for example, by composing the material mass 2 in layers according to the layers 33A-33B-33C represented in dashed line 32 and by herein applying for the non-homogenously composed layer 33B the techniques such as discussed in respect to FIGS. 6 and 7.

Further, FIG. 8 shows by the arrows 34 that the third component possibly can diffuse into the actual material of the material mass 2, either already before pressing, for example, during the pre-densification thereof or even still before this, or during pressing, or during a possible, whether or not intentional, post-treatment of the pressed material mass 2, such as when cooling the obtained board 1, or when hot stacking such boards 1, wherein these boards 1 then preferably remain one or more hours in a space in which a controlled temperature is prevailing.

Such diffusion as shown by the arrows 34 can also be obtained when working with a third component which expands or foams. As already mentioned above, such foaming or expanding agent, according to a deviating particular independent aspect, also may be present more or less homogenously in the material mass or board, or may be concentrated in one or more layers of such material mass or board.

Figure 9:
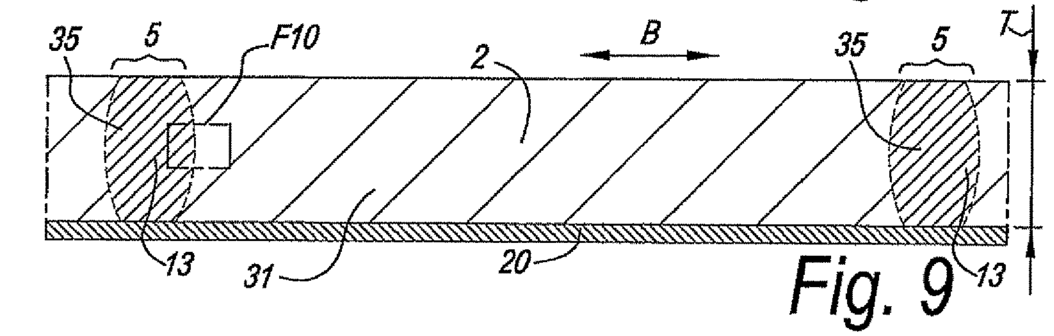

FIG. 9 shows still another example of a material mass 2 having in its width direction B zones 5, the composition of which is realized differently in that a third component is applied in the zone 5 concerned. Herein, these zones 5 extend over the entire depth or thickness T of the material mass 2 concerned. Such material mass 2 can be composed, for example, by strewing other materials in the width direction B of the material mass 2 to be composed, for example, by means of adjacently positioned strewing devices 15.

In connection with FIGS. 6 through 9, it is noted that it is clear that instead of said third component, also said first and/or second component may be applied, which then are present in an altered concentration in the material portion 7 concerned, or possibly are absent from this material portion 7. In the zones 5 concerned, one may, of course, also work with a material which as such consists of several components, such as a wood-plastic composite.

Further, it is noted that the material masses 2 represented in FIGS. 7 to 9 have the advantage that they can be made with a substantially flat surface. Such flat material masses 2 can be pressed more simply.

It is clear that the zones of different realization represented in FIGS. 5 to 9 are aligned according to the longitudinal direction L of the material mass 2. However, it is not excluded that they are aligned in another direction or even are provided randomly. Also, it is not excluded that such zones 5 in one and the same board 1 are aligned according to several directions. So, for example, may such zones 5 of different realization be aligned both in length and in width directions L-B. It is clear that in such case a board 1, such as the board 1 of FIG. 1, can be obtained by means of a method of the third aspect.

Figure 10:
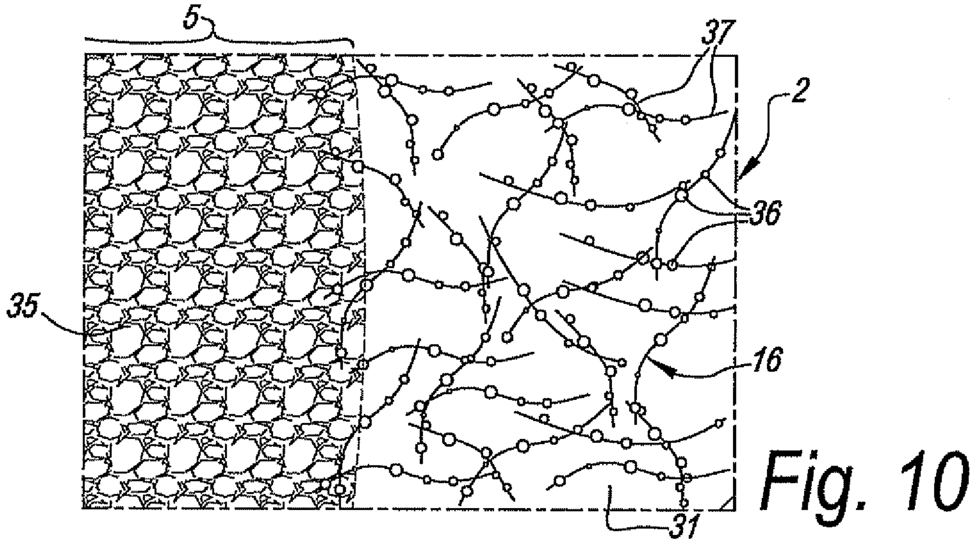
FIG. 10, at a larger scale, represents a view on the are indicated by F10 in FIG. 9.

FIG. 10 represents an example, wherein said third component 35 relates to a particle-shaped component, for example, a synthetic material, which is supplied to the material mass 2 in the form of granules. This embodiment is illustrated here by means of a material mass 2 to be pressed, which substantially consists of fibers 37 provided with binding agent 36, as it is the case with the material mass 2 for a board 1 substantially made as a MDF or HDF board. The represented organic fibers 37 or wood fibers are provided with polycondensation glue in the form of droplets, which substantially occurs with relatively low gluing degrees, such as with a glue content smaller than 10 weight percent. It is clear that according to a not represented variant of this embodiment, also a fiber-shaped third component instead of a particle-shaped third component 35 may be applied. So, for example, reinforcement fibers, such as glass fiber or carbon fiber, may be used. Further, it is clear that the third component 35 as such can consist of several components, as this may be the case, for example, with a third component 35 consisting of wood-plastic composite or a semi-finished product therefor, which then as such is supplied in the form of fibers or granules.

Figure 11:
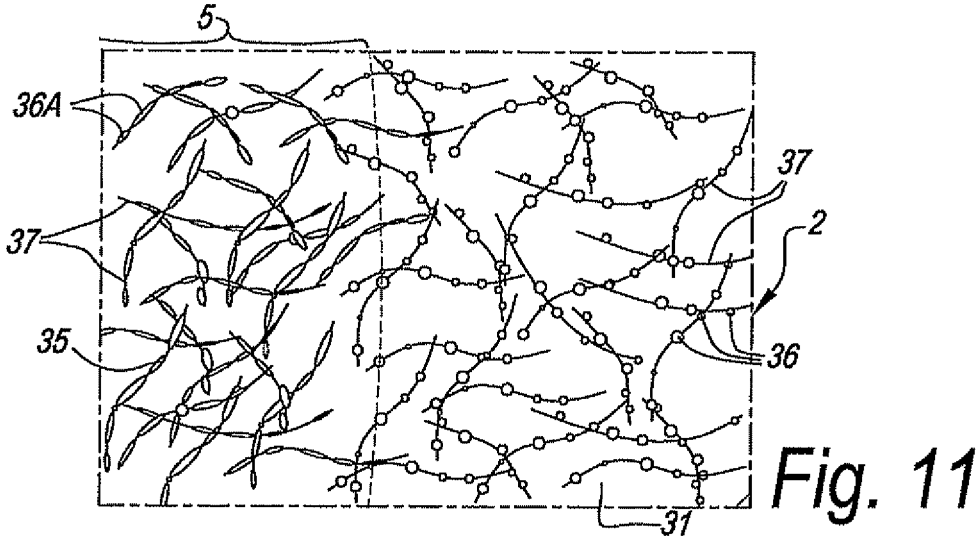
FIGS. 11 to 13, in the same view, represent variants.

FIG. 11 shows an example in which the material mass 2 for the board 1 substantially is constructed as in the case of FIG. 10, however, wherein the differing composition of the depicted material zone 2 consists in that the fiber material 37 is provided with binding agent 36 in another manner, more particularly is differently provided with glue, either in that the fibers 37 are provided with another quantity of this binding agent 36, or in that the fibers 37 are provided with another binding agent 36A, or by a combination of both. So, for example, in the respective material zone 5, so-called MDI glue (methane diphenyl diisocyanate glue) can be applied, whereas substantially in the material mass 2 for the board 1 another binding agent 36A, such as MUF glue (melamine urea formaldehyde glue) is applied. Preferably, the fibers 37 in such material zone 5 are glued in a waterproof manner or acetylated.

Figure 12:
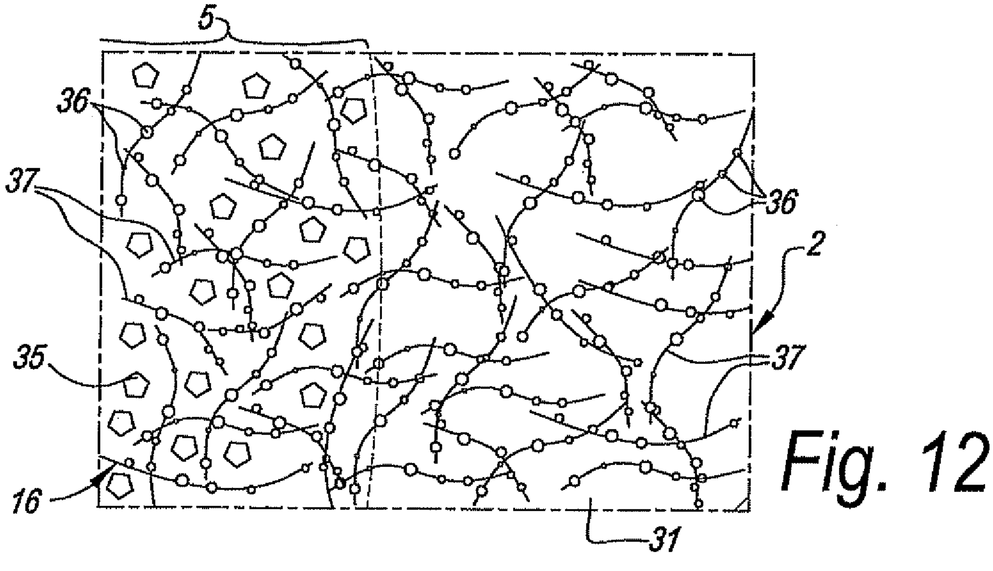

FIG. 12 shows an example, wherein the material mass 2 for the board 1 again substantially is constructed as in the case of FIGS. 10 and 11, however, wherein the differing composition of the depicted material zone 5 consists in that a third component 35 has been added to the glue-provided fibers 37, which component preferably is provided in solid form in the material mass 2, for example, in the form of granules or fibers, but which also may be supplied in liquid form. So, for example, an additional synthetic material may be supplied in particle form to the material zone 5 concerned. Preferably, in the case of MDF or HDF, this either relates to a polycondensation glue selected from the also above-mentioned series, or to a synthetic material selected from the series of polyethylene, polyethylene terephthalate, polypropylene, polystyrene, polycarbonate, polyurethane and polyvinyl chloride. It is also possible that the third component 35 as such is composed of multiple components; so, for example, may the third component 35 as such consist of a wood-plastic composite or a semi-finished product thereof, which then as such is added in the form of granules or in the form of fibers. The third component 35 may also be recovered from recycled materials, such as from PET bottles and the like. Another example of a possible third component 35 relates to reinforcing fibers, such as glass fiber or carbon fiber, which then possibly as such may be provided with glue. Still another example of a third component 35 relates to modified wood fibers, whether or not provided with glue, such as acetylated wood fibers. Still another example relates to locally adding a colorant or other recognition means as the third component 35. Such recognition means are not restricted to visually recognizable means, but may also be materials which can be perceived in any other manner, such as, for example, iron filings, which can be recognized, amongst others, magnetically.

Figure 13:
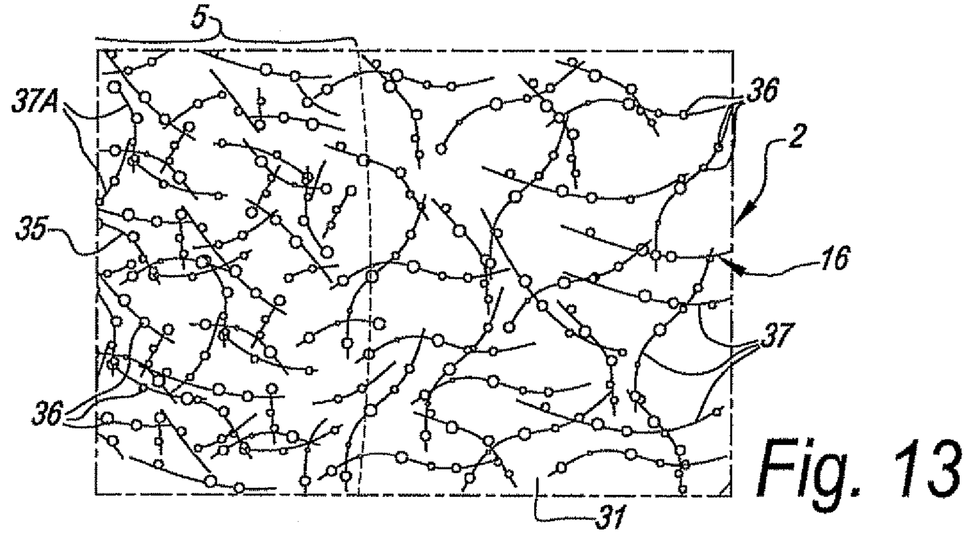

FIG. 13 shows another example of a material mass 2 substantially consisting of the same material as in the case of the FIGS. 10 to 12. Herein, in the material zone 5 concerned the quantity and length of the fibers 37 are varied in respect to the remainder of the material mass 2. In the example, in the material zone 5 concerned a larger quantity of shorter fibers 37A is used. Of course, according to not represented variants, it is also possible to vary only the length of the fibers 37A or only the concentration of fibers 37 in respect to the remainder of the material mass 2. Another not represented variant consists in orienting the fibers 37 in the material zone 5 concerned globally in another direction than the fibers 37 of the remainder of the material mass 2. Techniques for orienting fibers are known as such, for example, from the patent documents U.S. Pat. No. 3,954,364, U.S. Pat. No. 4,415,324, U.S. Pat. No. 4,284,595, U.S. Pat. No. 4,287,140, U.S. Pat. No. 4,322,380, U.S. Pat. No. 4,323,338, U.S. Pat. No. 4,111,294, U.S. Pat. No. 4,113,812, U.S. Pat. No. 4,432,916 and JP 9-158100. From these documents, it is known to orient fibers by means of electrical fields and to compose a homogenous material mass to be pressed by means of these substantially oriented fibers. However, the present invention according to the here described embodiment thereof relates to locally applying oriented fibers. By "oriented" is meant that the fibers substantially have a common direction. So, for example, is it possible that in a material zone with oriented fibers, these fibers substantially are directed according to the longitudinal direction of the material mass. This means that the majority of the fibers in such case form an angle with this longitudinal direction which is smaller than 45°.

It is clear that the FIGS. 10 through 13 relate to all possible forms of differingly composed material masses 2 to be pressed, such as, for example, to the embodiments represented in the FIGS. 6 through 9.

Referring to FIG. 4, it is noted further that a material mass 2, for example, such as the one represented in FIGS. 6 through 9, also can be formed by providing the material 35A to be added in the material mass 2 while the latter is being composed, for example, by adding this material in the form of strips or ribbons to the material mass which is being constructed, for example, in the strewing chamber 18. As represented here, this material 35A might be supplied, for example, from a roll. According to a not represented possibility, the material 35A might be provided on the material mass 2 being constructed, for example, in liquid or quasi liquid form, for example, by means of spraying heads or extruder channels. Supplying as a strip or ribbon, or by means of spraying heads or extruder channels, is of interest, for example, in case the added material 35A is hot melt glue. Such extruder channels may also be applied when the added material is a wood-plastic composite.

Figure 14:
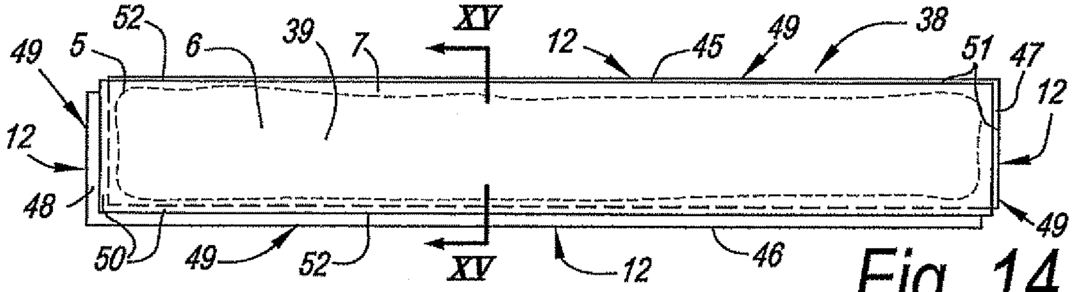
FIG. 14 represents a panel, more particularly a floor panel, which is obtained from a board according to the invention by means of subdivision.

FIG. 14 shows a floor panel 38, which is composed starting from a board 1 with the characteristics of the invention. This relates, for example, to a board 1 of the type represented in FIG. 2, which board in a first step in a manufacturing process for a floor panel 38, preferably by means of a DPL process, is provided with a laminate top layer 39. Such laminate top layer 39 comprises one or more material sheets 40 provided with resin and, in the case of a DPL process, is realized by bringing the resinated material sheets 40 together with the substrate 41 into a press, wherein the resin of the material sheets 40 solidifies under the influence of increased temperature and pressure in the press device and thereby provides for the mutual connection of the material sheets 40, in other words, the formation of the laminate top layer 39 itself, as well as for the connection of the top layer 39 and the substrate 41.

Figure 15:
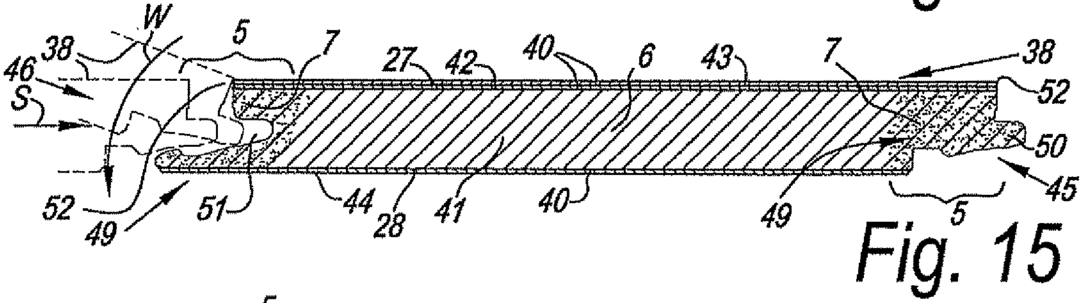
FIG. 15, in cross-section and at a larger scale, represents a view according to the line XV-XV indicated in FIG. 14.

FIG. 15 clearly shows the structure of the laminate top layer 39. As aforementioned, this latter here consists of two material sheets 40 provided with resin, namely a decor layer 42 with a printed pattern and a protective layer 43 or so-called overlay, which is translucent or transparent and is situated above the decor layer 42. Such protective layer 43 may comprise wear-preventing additives, such as hard particles. Various possibilities for such wear and/or scratch-preventing additives are described in the international patent application PCT/IB2007/0001493 of applicant. In the example, at the underside 28 of the board 1 also a material sheet 40 provided with resin is provided, preferably during said DPL process, which material sheet 40 serves as a so-called balancing layer or backing layer 44.

It is noted that a laminate top layer 39 can also be obtained by means of the so-called HPL process. In this process, the material sheets 40 provided with resin as such first are pressed to form a laminate layer, after which they are provided on the substrate 41 or on the board 1, for example, by gluing them on the substrate 41 or on the board 1. A HPL top layer usually comprises more material sheets 40 than a DPL top layer and therefore is made thicker. It is obvious that within the scope of the present invention also other top layers than laminate top layers 39 can be applied, such as, for example, wooden top layers.

Preferably after the application of the top layer 39, the board 1 concerned, in a second step prior to manufacturing a floor panel 38, is subdivided, according to the cutting lines 10 shown in FIG. 2, into smaller rectangular oblong panels 11, which substantially show the dimensions of the here represented final floor panel 38. The obtained panels 11 are provided with coupling means 49 at least at two and preferably at all opposite edges 45-46 and 47-48, for example, by means of a milling process. FIG. 15 clearly shows that these coupling means 49 can be made at least partially and in this case completely in a modified material portion 7 of the original board 1, by which particularly advantageous features for the final floor panel 38 can be obtained. So, for example, by the different composition of the material an increased strength and/or waterproofness of the connection may be obtained by means of the coupling means 49.

The coupling means 49 which are represented in FIG. 15 substantially are made as a tongue 50 and a groove 51, however, allowing that two of such floor panels 38, when cooperating with each other, can be locked in a vertical direction V1 perpendicular to the plane of the coupled floor panels 38 and in a horizontal direction H1 perpendicular to the coupled side and in the plane of the coupled floor panels 38. Such couplings are known as such and preferably provide for a connection free from play or almost free from play, as may be the case, for example, with the coupling means known from WO 97/47834. Herein, the connection of two of such floor panels 38 may be obtained substantially in three possible ways, namely by means of a turning movement W of the floor panels 38 around the upper edges 52 of the respective sides, by means of a substantially horizontal shifting movement S of the floor panels 38 towards each other, or by means of a substantially downward movement at the edges of the floor panels 38.

It is clear that the board 1, by means of which the substrate 41 of the floor panel 1 of FIG. 15 is formed, can be manufactured by pressing a material mass 2 with the characteristics of, amongst others, FIG. 5 or 9.

Figure 16:
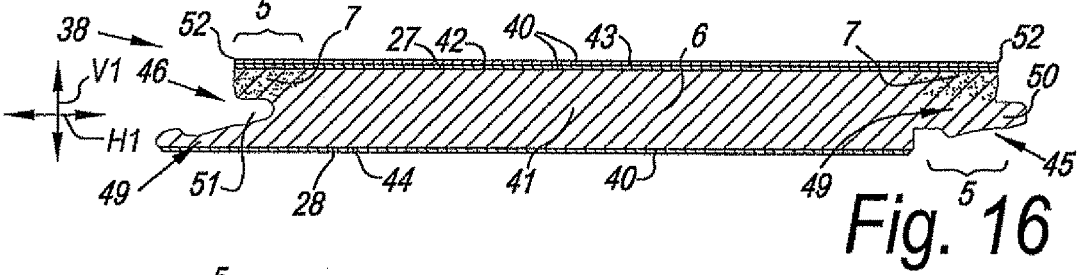
FIGS. 16 and 17 represent variants of such panel in the same view as FIG. 15.

FIG. 16 shows another example of such floor panel 38, wherein the board 1, from which the substrate 41 for this floor panel 38 is obtained, can be manufactured by pressing a material mass 2 showing, amongst others, the characteristics of FIG. 6 or 7.

Figure 17:
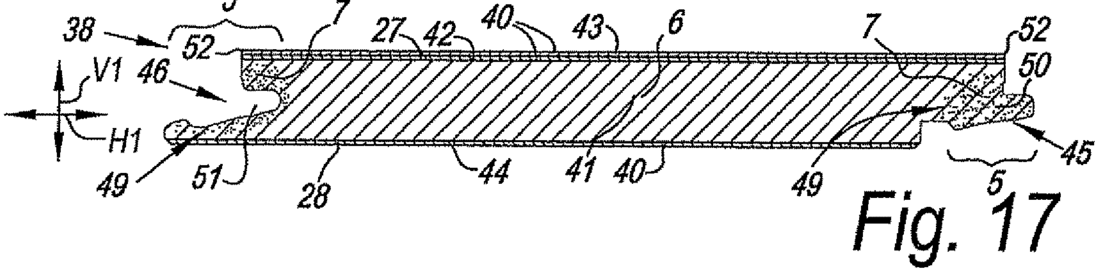

FIG. 17 shows another example of such floor panel 38, wherein the board 1, from which the substrate 41 for this floor panel 1 is obtained, can be manufactured by pressing a material mass 2 showing, amongst others, the characteristics of FIG. 8.

It is noted that in the case of a board which is manufactured by a continuous production process, such as in FIG. 4, preferably the production direction of the respective board is chosen as the longitudinal direction of the board or of the material mass to be pressed, even if this would mean that the obtained boards have a length which is smaller than their width.

The present invention is in no way restricted to the herein above-described embodiments; on the contrary, such boards, panels and methods may be realized according to various variants, without leaving the scope of the present invention.

The invention claimed is:

1. A board comprising:

a pressed material mass forming a board having a length, a width, and a depth, said pressed material mass having at least first and second components, the first component including an organic material, and the second component including a binding agent arranged for binding said first component;

wherein said board is free of structural recesses;

wherein said material mass forming the board comprises a plurality of first portions and a plurality of second portions aligned along a horizontal plane with respect to a top surface of the board in at least one of a length direction and width direction of the board, wherein said plurality of second portions have a differing composition than said plurality of first portions, wherein said plurality of first portions comprise the first and second components and the plurality of second portions comprise the first and second components and at least a third component, said third component forming part of the pressed material mass itself and being only located within the plurality of second portions so as to be absent in a remainder of the board outside the plurality of second portions, wherein said first component comprises wood fiber material, wherein said second component is a polycondensation glue, selected from the group consisting of urea formaldehyde glue, melamine glue, melamine formaldehyde glue, methane diphenyl diisocyanate glue, phenol formaldehyde glue, resorcinol formaldehyde glue and resorcinol phenol formaldehyde glue, and wherein said board is substantially made as a wood fiberboard selected from the group consisting of medium density fiberboard (MDF) and high density fiberboard (HDF).

2. The board according to claim 1, wherein the plurality of first portions and the plurality of second portions have a length and width and extend in at least one of the length and width directions of the board so that said plurality of first portions and said plurality of second portions form longitudinal strip portions substantially parallel to each other and that extend in at least one of the length direction and width direction of the board.

3. The board according to claim 1, wherein the plurality of first portions and the plurality of second portions have a length and width and are aligned along at least one of the length and width directions of the board so that said plurality of first portions form longitudinal strip portions and said plurality of second portions form material zones adjacent to said longitudinal strip portions in at least one of the length direction and width direction of the board.

4. The board according to claim 3, wherein the plurality of second portions are adjacent the length and width of the longitudinal strips portions of the plurality of first portions so as to surround the plurality of first portions.

5. The board according to claim 3, wherein the plurality of second portions are adjacent the length of said longitudinal strip portions of the plurality of first portions.

6. The board according to claim 3, wherein the plurality of second portions are adjacent the width of said longitudinal strip portions of the plurality of first portions.

7. The board according to claim 1, wherein the third component when provided in the not yet pressed material mass is either in liquid form or in solid form or as a coating provided on the organic material.

8. The board according to claim 1, wherein said board is configured in a way such that said board is able to be used for manufacturing floor panels.

9. A board comprising a pressed material mass having at least first and second components, the first component including an organic material, and the second component including a binding agent arranged for binding said first component;

wherein said board is free of structural recesses;

wherein the board further comprises at least a foamed or expanded component comprising an amino resin foam;

wherein the board defines a substantially homogenous composition along a horizontal plane with respect to a top surface of the board, said foamed or expanded component being concentrated in at least one layer in a center of the board within the board and said foamed or expanded component being absent in at least one layer above or one layer below the at least one layer in the center of the board, and wherein a remainder of said board outside said center of the board is free from said foamed or expanded component.

10. The board according to claim 9, wherein said organic material comprises at least one of wood fibers and wood chips.

11. The board according to claim 9, wherein the binding agent substantially consists of a polycondensation glue.

12. A board substantially consisting of a pressed material mass having at least first and second components, the first component including an organic material, and the second component including a binding agent arranged for binding said first component;

wherein said board is free of structural recesses;

wherein said material mass defines a differing composition located in a plurality of localized material portions across a thickness of the board in a horizontal plane with respect to a top surface of the board in at least one of a length direction and width direction of the board, the plurality of material portions each including at least a third component, said third component forming part of the pressed material mass itself and being only located within the plurality of material portions so as to be absent in a remainder of the board outside the plurality of material portions, wherein said first component is a wood fiber material, wherein said second component is a polycondensation glue, selected from the group consisting of urea formaldehyde glue, melamine glue, melamine formaldehyde glue, methane diphenyl diisocyanate glue, phenol formaldehyde glue, resorcinol formaldehyde glue and resorcinol phenol formaldehyde glue, and wherein said board is substantially made as a wood fiberboard selected from the group consisting of medium density fiberboard (MDF) and high density fiberboard (HDF).

13. The board according to claim 12, wherein said board is configured in a way such that said board is able to be used for manufacturing floor panels.

* * * * *